US010977041B2

(12) United States Patent
Francois et al.

(10) Patent No.: US 10,977,041 B2
(45) Date of Patent: Apr. 13, 2021

(54) OFFSET-BASED MECHANISM FOR STORAGE IN GLOBAL COMPLETION TABLES

(71) Applicant: INTERNATIONAL BUSINESS MACHINES CORPORATION, Armonk, NY (US)

(72) Inventors: Avery Francois, Austin, TX (US); Richard Joseph Branciforte, Austin, TX (US); Gregory William Alexander, Pflugerville, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 120 days.

(21) Appl. No.: 16/286,754

(22) Filed: Feb. 27, 2019

(65) Prior Publication Data
US 2020/0272468 A1   Aug. 27, 2020

(51) Int. Cl.
   *G06F 9/38*   (2018.01)
(52) U.S. Cl.
   CPC ........................ *G06F 9/38* (2013.01)
(58) Field of Classification Search
   CPC ........ G06F 9/38; G06F 9/3855; G06F 9/3851; G06F 9/3857
   See application file for complete search history.

(56) References Cited

U.S. PATENT DOCUMENTS

| | | | |
|---|---|---|---|
| 6,311,260 B1 * | 10/2001 | Stone | G06F 9/383 711/137 |
| 6,721,874 B1 | 4/2004 | Le | |
| 7,472,258 B2 | 12/2008 | Burky | |
| 7,546,393 B2 | 6/2009 | Day | |
| 8,285,973 B2 | 10/2012 | El-Essawy | |
| 8,386,753 B2 | 2/2013 | Eisen | |
| 9,489,207 B2 | 11/2016 | Burky | |
| 9,672,044 B2 | 6/2017 | Tran | |
| 10,007,526 B2 | 6/2018 | Alexander | |
| 2003/0182537 A1 | 9/2003 | Le et al. | |
| 2008/0059600 A1 * | 3/2008 | Bestler | H04L 67/1097 709/212 |
| 2008/0072018 A1 | 3/2008 | Le | |
| 2010/0262806 A1 * | 10/2010 | Doing | G06F 9/3853 712/205 |

(Continued)

OTHER PUBLICATIONS

Kalla et al.; "IBM POWER5 Chip: A Dual-Core Multithreaded Processor", IEEE Micro, vol. 24, Issue 2, pp. 40-47, Mar.-Apr. 2004.

(Continued)

*Primary Examiner* — Farley Abad
(74) *Attorney, Agent, or Firm* — Cantor Colburn LLP; William Kinnaman

(57) ABSTRACT

A method includes allocating a first entry in a global completion table (GCT) on a processor, responsive to a first instruction group being dispatched, where the first entry corresponds to the first instruction group. A data value applicable to the first instruction group is identified. An offset value applicable to the first instruction group is calculated by subtracting, from the data value, a base value previously written to a second entry of the GCT for a second instruction group. The offset value is written in the first entry of the GCT in lieu of the data value.

17 Claims, 4 Drawing Sheets

(56) References Cited

U.S. PATENT DOCUMENTS

2013/0007423 A1  1/2013  Burcea
2014/0129800 A1  5/2014  Deutschle
2016/0117175 A1  4/2016  Alexander et al.
2019/0004805 A1  1/2019  Al Sheikh

OTHER PUBLICATIONS

Kedzierski et al.; "Analysis of Multithreading Capabilities of Current High-Performance Processors", XVII Jornadas de Paralelismo-Albacete, Sep. 2006. 6 pages.
Manousopoulos et al.; "Characterizing Thread Placement in the IBM Power? Processor", IISWC IEEE International Symposium on Workload Characterization, Nov. 4-6, 2012. pp. 120-130.
Ruan et al.; "On the Effectiveness of Simultaneous Multithreading on Network Server Workloads", Princeton University, Report ID: TR-793-07, pp. 1-12, Jul. 2007.

* cited by examiner

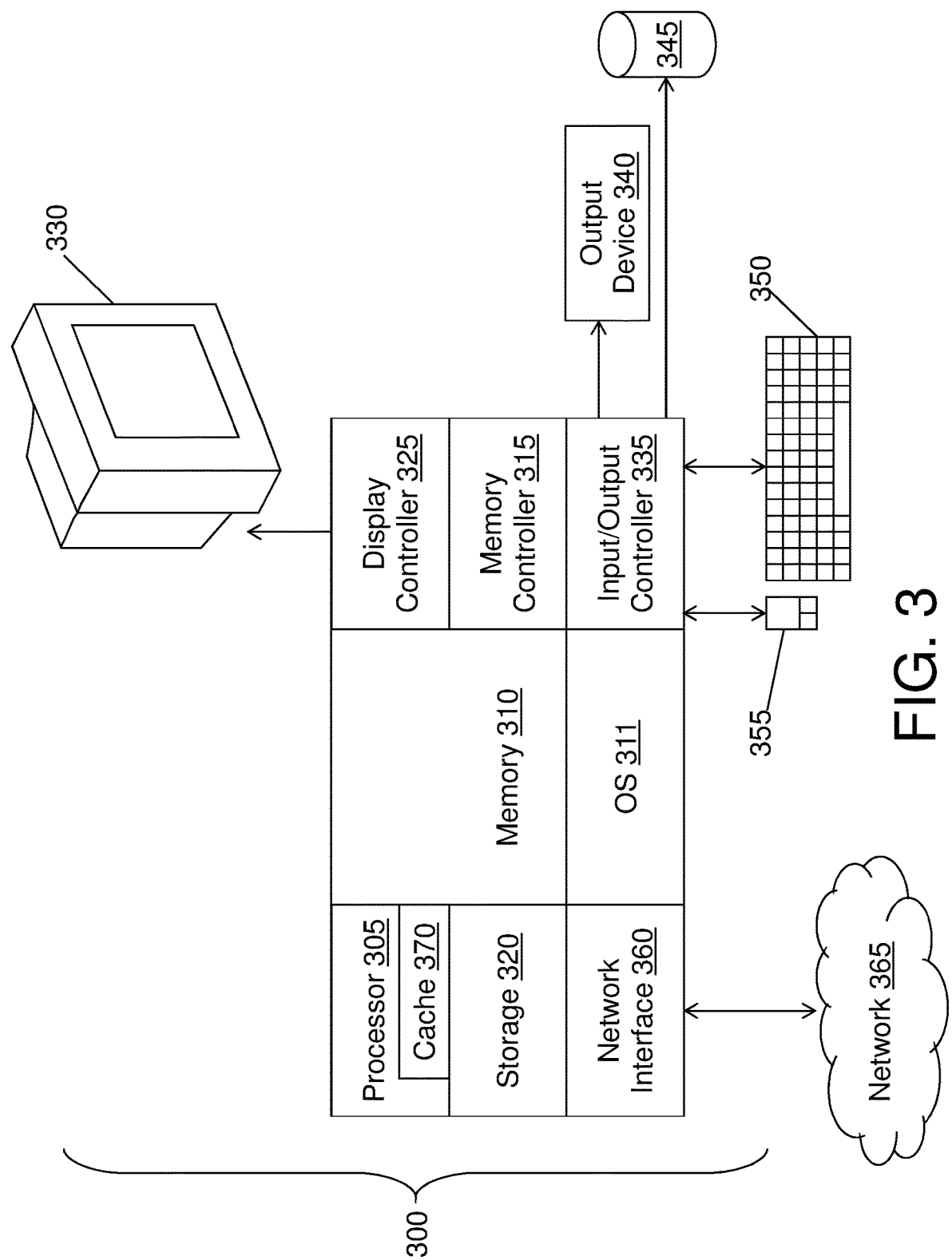

US 10,977,041 B2

OFFSET-BASED MECHANISM FOR STORAGE IN GLOBAL COMPLETION TABLES

BACKGROUND

The present invention relates to global completion tables and, more specifically, to an offset-based mechanism for data storage in global completion tables.

In some computer systems, global completion tables are sometimes included for organizing instructions. As computer instructions flow through a machine, the global completion table, residing on a processor of the machine, groups and reorders the instructions as needed. After instructions are dispatched and grouped for execution, the instructions go through various operations before being completed. During this stage, the instruction groups are tracked through the global completion table. Space in the global completion table is allocated when an instruction group is dispatched, at which time information about the group is written to the global completion table, and that information is removed after a flush (i.e., rollback) or completion of the instruction group.

SUMMARY

Embodiments of the present invention are directed to a method. A non-limiting example of the method includes allocating a first entry in a global completion table (GCT) on a processor, responsive to a first instruction group being dispatched, where the first entry corresponds to the first instruction group. A data value applicable to the first instruction group is identified. An offset value applicable to the first instruction group is calculated by subtracting, from the data value, a base value previously written to a second entry of the GCT for a second instruction group. The offset value is written in the first entry of the GCT in lieu of the data value.

Embodiments of the present invention are directed to a system. A non-limiting example of the system includes a GCT along with one or more threads of one or more processes in execution, where the one or more threads have access to the GCT. The one or more threads are configured to allocate a first entry in the GCT, responsive to a first instruction group being dispatched, where the first entry corresponds to the first instruction group. The one or more threads are further configured to identify a data value applicable to the first instruction group, and to calculate an offset value applicable to the first instruction group by subtracting, from the data value, a base value previously written to a second entry of the GCT for a second instruction group. The one or more threads are further configured to write the offset value in the first entry of the GCT in lieu of the data value.

Embodiments of the present invention are directed to a computer processor. A non-limiting example of the computer processor includes a GCT along with one or more threads of one or more processes in execution, where the one or more threads have access to the GCT. The one or more threads are configured to allocate a first entry in the GCT, responsive to a first instruction group being dispatched, where the first entry corresponds to the first instruction group. The one or more threads are further configured to identify a data value applicable to the first instruction group, and to calculate an offset value applicable to the first instruction group by subtracting, from the data value, a base value previously written to a second entry of the GCT for a second instruction group. The one or more threads are further configured to write the offset value in the first entry of the GCT in lieu of the data value.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3 is a block diagram of a computer system for implementing some or all aspects of the storage system, according to some embodiments of this invention.

Figure 1A:
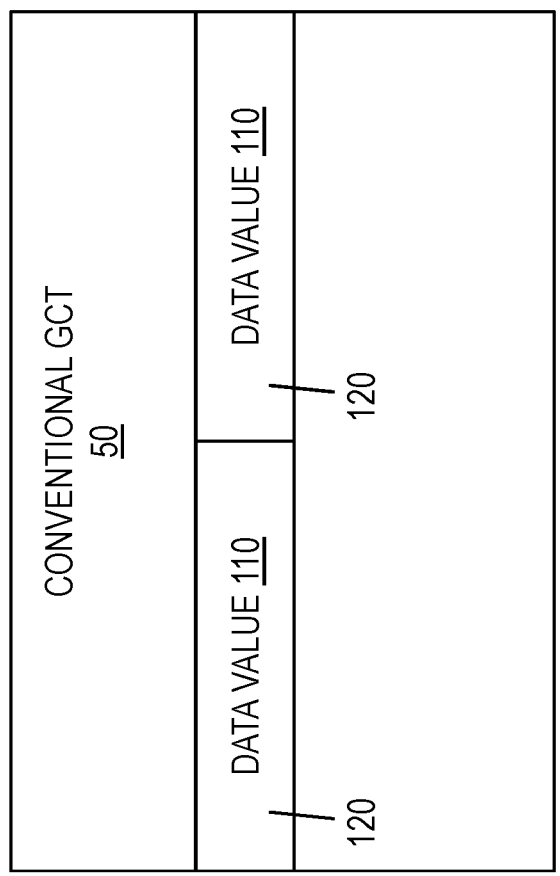
FIG. 1A is a diagram of a conventional global completion table.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, because the global completion table (GCT) resides on the processor itself, space-saving is crucial due to limited available space. The GCT can include various information about instruction groups, including, among others, one or more data values. Such data values may include, for instance, a pointer to a buffer maintaining data and addresses for store operations in the instruction groups or maintaining data necessary for tracking various microarchitectural tags of the instruction groups. Conventionally, at least one such data value is provided for each instruction group, even though data values from group to group can be related, e.g., due to pointing to the same buffer. Thus, the inclusion of a data value for each instruction group does not take advantage of redundant information across data values.

Turning now to an overview of the aspects of the invention, one or more embodiments of the invention address the above-described shortcomings of the prior art by preserving space in the GCT through the use of offset values to take the place of full data values. More specifically, for instance, a base value may be included in the GCT for a first instruction group, where the base value is equal to the data value that would conventionally be used, while an offset value may be stored in the GCT for a second instruction group, such that the offset value plus the prior base value determined the data value for the second instruction group.

The above-described aspects of the invention address the shortcomings of the prior art by improving the GCT. According to some embodiments of the invention, because fewer bits are needed to store an offset value versus a complete data value, space can be saved in the GCT, and as a result, the power consumption needed to maintain the GCT can be reduced. This can lead to an improvement in the efficiency of the computer system as a whole because processor efficiency is a key component of computing efficiency.

Figure 1B:
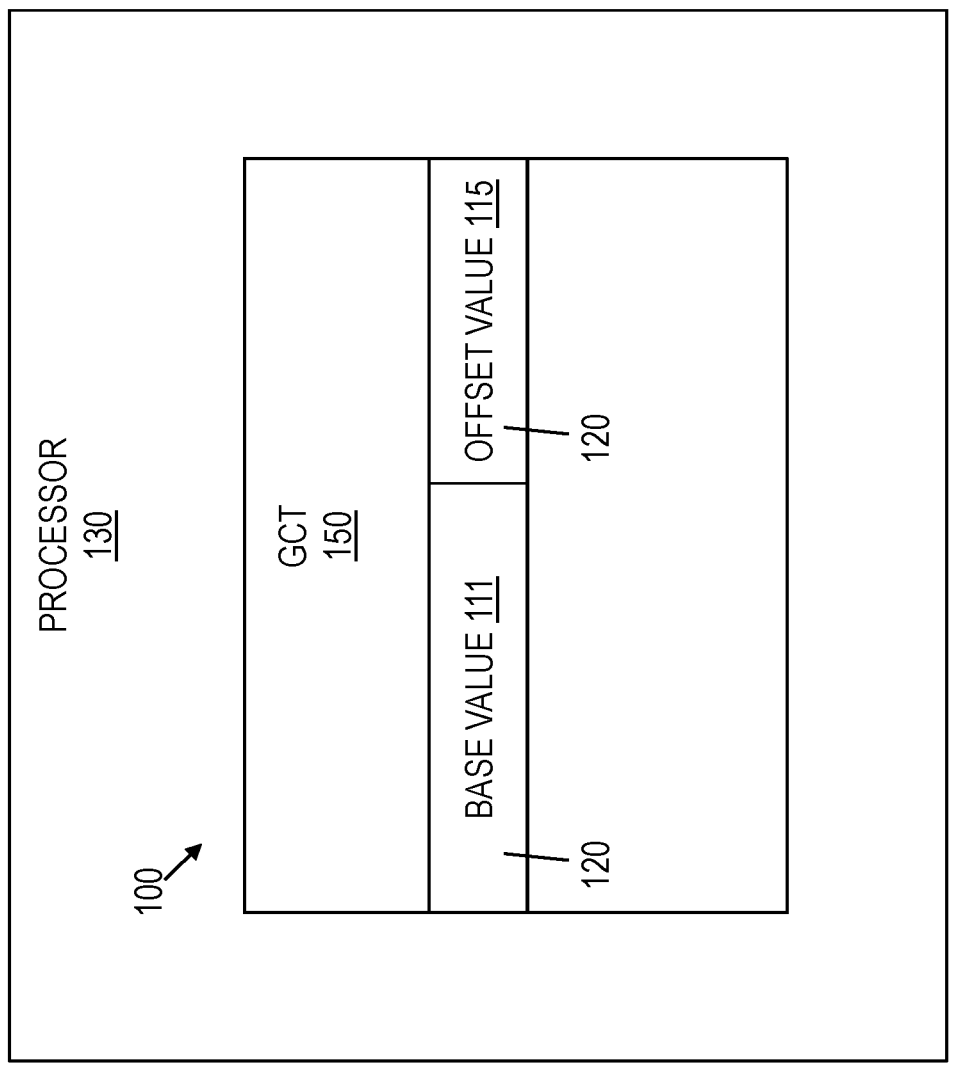
FIG. 1B is a diagram of a global completion table using a storage system with an offset-based storage mechanism, according to some embodiments of the invention.

Turning now to a more detailed description of aspects of the present invention, FIG. 1A is a diagram of a conventional global completion table 50, while FIG. 1B is a diagram of an improved global completion table 150 in a storage system 100 according to some embodiments of this invention. Typically, a conventional GCT 50 tracks various data. FIGS. 1A-1B illustrate a mere subset of that data, as will be understood by one skilled in the art.

Specifically, as shown in FIG. 1A, a conventional GCT 50 stores a set of data values 110, which include a respective data value 110 for each instruction group. Each entry 120 of the conventional GCT 50 represents a respective instruction group and includes the data value 110, potentially along with other data, for that instruction group. For example, and not by way of limitation, the data value 110 referred to in this disclosure may be location of a pointer to a location in a buffer, where the data at the pointer location is being utilized by the instruction group. As shown in FIG. 1, for each instruction group, the conventional GCT 50 includes at the respective entry 120 the full data value 110. In other words, conventionally, the data value 110 is stored in full in the respective entry 120 of the conventional GCT 50 for every entry 120 in use.

FIG. 1B illustrates a GCT 150 in a storage system 100 according to some embodiments. The storage system 100 with the GCT 150 shown in FIG. 1B may be implemented by, or otherwise integrated with, a processor 130 of a computer system, so as to track instruction groups in the processor 130, and thus the processor 130 may include the improved GCT 150 described herein.

Like the conventional GCT 50, the improved GCT 150 tracks instruction groups. Typically, an entry 120 in the GCT 150 is allocated for use when an instruction group is dispatched (i.e., submitted to issue queues), and information related to that instruction group is then written to the corresponding entry 120 that was allocated. In the GCT 150, each entry 120 may correspond to one or more instruction groups. In a multi-threaded processor 130, the various threads may each have access to the GCT 150 for tracking instruction groups, and each GCT entry 120 may belong to a single respective thread. Thus, if an entry 120 corresponds to multiple instruction groups, then each of such instruction groups typically belong to a common thread. For the sake of simplicity, throughout this disclosure, each entry 120 is described as being associated with an instruction group. However, it will be understood by one skilled in the art that such an entry 120 may be associated with additional instruction groups as well.

The size of a GCT 150 may vary between embodiments. For example, and not by way of limitation, in some embodiments, the GCT 150 has 60 entries, each corresponding to 3 instructions in a single instruction group. However, alternatively, for example, the GCT 150 may have 256 entries each corresponding to a single instruction. Further, for example, a full data value 110 may be stored in 8 bits, while an offset value 115, as described below, may be stored in 2 bits or 1 bit. Thus, it will be understood that space in the GCT 150 is limited, and conservation of that space is essential.

As shown in FIG. 1B, in some embodiments of the invention, the improved GCT 150 stores a data value 110 for an instruction group in one of two ways. For instance, the GCT 150 may store a full data value 110, also referred to as a base value 111, for some instruction groups. For other instruction groups, in some embodiments of the invention, the GCT 150 stores an offset value 115, which may be the difference between the actual data value 110 and a prior base value 111 stored for another instruction group, and in this case the full data value 110 is not stored for such instruction groups. This will be described in more detail below.

The improved GCT 150 may utilize pairs of entries 120 in the GCT 150, including a first entry 120 and a second entry 120. It will be understood that pairs of entries 120, as described herein, can be implemented in various ways. For instance, such a pair may be made up of two distinct entries 120 or may include a single entry 120, or record, divided into two smaller entries 120.

The first entry 120 in a pair may be associated with a first instruction group and may include a base value 111 equal to a first data value 110 applicable to that first instruction group. The second entry 120 may be associated with a second instruction group and may include an offset value 115, such that the offset value 115 of the second instruction group plus the base value 111 of the first instruction group sum to a full data value 110 applicable to the second instruction group. However, that full data value 110 applicable to the second instruction group is not actually stored in full in the GCT 150, according to some embodiments of the invention. Rather, the data value 110 of the second instruction group is determinable by adding the base value 111 of the first instruction group, stored in the first entry 120 of the GCT 150, and the offset value 115 of the second instruction group, stored in the second entry 120 of the GCT 150.

Thus, when a thread allocates a first entry 120 in the GCT 150 for the first instruction group, the thread may then write to the first entry 120 a base value 111 that equals the full data value 110 applicable to that instruction group. Later, when the thread allocates a second entry 120 for the second instruction group, the thread may write to that second entry 120 an offset value 115 representing the data value 110 of the second instruction group, where the offset value 115 may be written in lieu of the full data value 110 for the second instruction group. As described above, the full data value 110 for the second instruction group can be fully determined based on the base value 111 of the first instruction group combined with the offset value 115 of the second instruction group. Additionally, for each consecutive instruction group for which an entry 120 is allocated belonging to the same thread, that thread may write a respective offset value 115 rather than the full data value 110. Thus, for each instruction group having an offset value 115 written to the GCT 150 rather than the data value 110 in full, the data value 110 applicable to an instruction group may be determined by adding the respective offset value 115 to the most recently written base value 111 of the same thread. As a result, each usage of an offset value 115 in lieu of a full data value 110 may reduce the number of bits used in the GCT 150, while maintaining the information needed.

In some cases, it can be established that a base value 111 would not be available to refer back to determine a full data value 110 from an offset value 115. For example, and not by way of limitation, if a flush (i.e., rollback) has occurred such that one or more consecutive entries have been removed from the GCT 150, then writing an offset value 115 will not provide the information necessary to determine a data value 110 for an instruction group. For another example, if the instruction group associated with the prior base value 111 in the GCT 150 is completed, then that associated entry 120 may be removed from the GCT 150 so the entry 120 can be reallocated.

In such cases, to ensure adequate information is provided for determining data values 110 from offset values 115, two entries 120 may be allocated for a single instruction group. In the first entry 120 of such entries 120, a base value 111 may be written, and in the second entry 120 of such entries 120, an offset value 115 may be written. In this case, the base value 111 need not be associated with a specific instruction group but, rather, may be provided to enable determination of data values 110 from offset values 115 written to consecutive entries 120. For example, and not by way of limitation, in this case, the base value 111 written to the first entry 120 may be the full data value 110 applicable to the instruction group, even though the first entry 120 itself is not associated with the instruction group. Further, the offset value 115 in the second entry 120, which is associated with the instruction group, may be given a value of 0. It will be understood, however, that other combinations of values may be used for the base value 111 and the offset value 115 in such circumstances.

Figure 2:
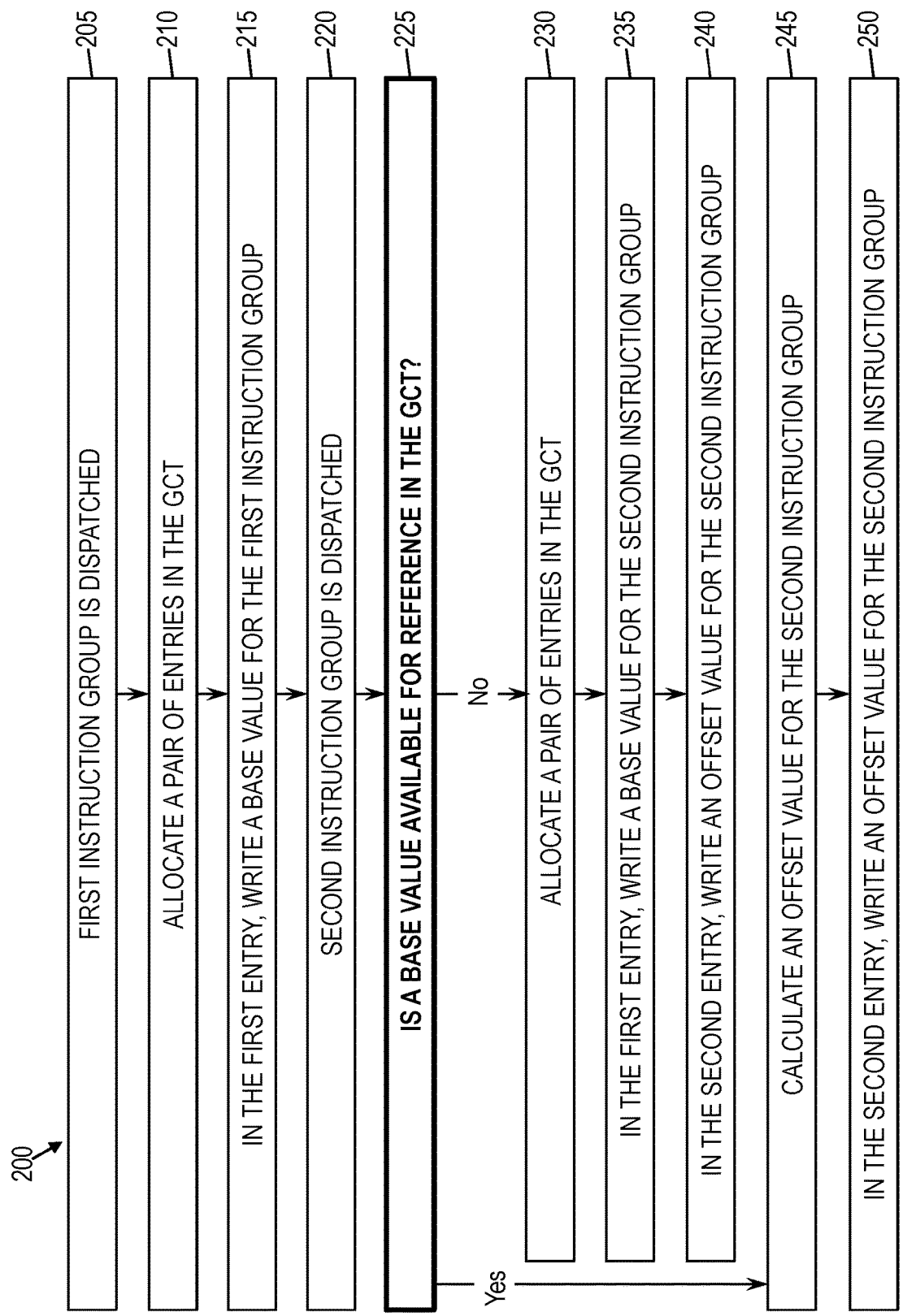
FIG. 2 is a flow diagram of a method of offset-based storage in a completion table, according to some embodiments of the invention.

FIG. 2 is a flow diagram of a method 200 of offset-based storage in a completion table, according to some embodiments of the invention. In some embodiments of the invention, this method 200 or similar may be performed by each thread of a processor 130 implementing the storage system 100 described herein. More specifically, this method 200 or similar may be performed for each instruction group of the thread.

In some embodiments of the invention, as shown in FIG. 2 and described below, GCT entries 120 are allocated in pairs, each of which includes a first entry 120 and a second entry 120. In this case, a base value 111 may be written into the first entry 120 assigned to a first instruction group, and an offset value 115 based on that base value 111 may be written into the second entry 120 for a second instruction group. Thus, in some embodiments of the invention, there typically may be an alternation between base values 111 and offset values 115 written, with some exceptions. Such an exception occurs, for instance, in the case of a flush or a completion as described above, in which case a base value 111 may be unavailable as a basis for an offset value 115.

As shown in FIG. 2, at block 205, a first instruction group may be dispatched belonging to a thread. At block 210, the thread may allocate a pair of entries 120 in the GCT 150, to hold both a base value 111 and an offset value 115. At block 215, the thread may write the data value 110 applicable to the first instruction group into a first entry 120 of the allocated pair. That data value 110 may act as, and be recognized as, a base value 111 for one or more future instruction groups. At block 220, a second instruction group may be dispatched belonging to the thread.

At decision block 225, the thread may determine whether a base value 111 is available in the GCT 150 for a prior instruction group. For example, and not by way of limitation, if the first instruction group has been flushed or completed, leading to deallocation of the associated entries 120, then the base value 111 written for the first instruction group may be no longer available in the GCT 150. If no such base value 111 is found, then at block 230, the thread may allocate a pair of entries 120 in the GCT 150 for both a full data value 110 and an offset value 115. At block 235, in the first entry 120, the thread may write a data value 110 applicable to the second instruction group. At block 240, in the second entry 120 of the pair, the thread may write an offset value 115, also for the second instruction group.

However, if such a base value 111 already exists for the second instruction group, then at block 245, the thread may calculate an appropriate offset value 115 for the second instruction group by identifying the actual data value 110 applicable to the second instruction group and reducing that by the most-recently-written base value 111 (e.g., for the first instruction group) of the same thread. At block 250, the thread may write that offset value 115 into the second entry 120 of the allocated pair of the GCT 150. Thus, later, when the data value 110 for the second instruction group is needed (e.g., so as to access data in the buffer), the data value 110 can be retrieved by adding the offset value 115 to the previous base value 111.

The above method 200 or similar may be repeated as the thread processes a stream of instruction groups with various pairs of first and second instruction groups. As a result, each instruction group represented in the GCT 150 is associated with a full data value 110, either explicitly in the form of a base value 111 or implicitly in the form of an offset value 115 that can be added to a prior base value 111. Although embodiments of the invention increase the complexity of storing data values, use of storage space is reduced, thus reducing power consumption for maintaining the GCT 150.

FIG. 3 is a block diagram of a computer system 300 for implementing some or all aspects of the storage system 100, according to some embodiments of this invention. The storage systems 100 and methods described herein may be implemented in hardware, software (e.g., firmware), or a combination thereof. In some embodiments, the methods described may be implemented, at least in part, in hardware and may be part of the microprocessor of a special or general-purpose computer system 300, such as a personal computer, workstation, minicomputer, or mainframe computer. For example, and not by way of limitation, the global completion table 150 described herein may be incorporated into a processor 130 belonging to a computer system 300 such as that shown in FIG. 3.

In some embodiments, as shown in FIG. 3, the computer system 300 includes a processor 305, memory 310 coupled to a memory controller 315, and one or more input devices 345 and/or output devices 340, such as peripherals, that are communicatively coupled via a local I/O controller 335. These devices 340 and 345 may include, for example, a printer, a scanner, a microphone, and the like. Input devices such as a conventional keyboard 350 and mouse 355 may be coupled to the I/O controller 335. The I/O controller 335 may be, for example, one or more buses or other wired or wireless connections, as are known in the art. The I/O controller 335 may have additional elements, which are omitted for simplicity, such as controllers, buffers (caches), drivers, repeaters, and receivers, to enable communications.

The I/O devices 340, 345 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 305 is a hardware device for executing hardware instructions or software, particularly those stored in memory 310. The processor 305 may be a custom made or commercially available processor, a central processing unit (CPU), an auxiliary processor among several processors associated with the computer system 300, a semiconductor-based microprocessor (in the form of a microchip or chip set), a macroprocessor, or other device for executing instructions. The processor 305 includes a cache 370, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 370 may be organized as a hierarchy of more cache levels (L1, L2, etc.). Further, in some embodiments of the invention, the processor 305 includes an improved GCT 150 as described herein.

The memory 310 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, or other types of storage media. Note that the memory 310 may have a distributed architecture, where various components are situated remote from one another but may be accessed by the processor 305.

The instructions in memory 310 may include one or more separate programs, each of which comprises an ordered listing of executable instructions for implementing logical functions. In the example of FIG. 3, the instructions in the memory 310 include a suitable operating system (OS) 311. The operating system 311 essentially may control the execution of other computer programs and provides scheduling, input-output control, file and data management, memory management, and communication control and related services.

Additional data, including, for example, instructions for the processor 305 or other retrievable information, may be stored in storage 320, which may be a storage device such as a hard disk drive or solid-state drive. The stored instructions in memory 310 or in storage 320 may include those enabling the processor to execute one or more aspects of the storage systems 100 and methods of this disclosure.

The computer system 300 may further include a display controller 325 coupled to a display 330. In some embodiments, the computer system 300 may further include a network interface 360 for coupling to a network 365. The network 365 may be an IP-based network for communication between the computer system 300 and an external server, client and the like via a broadband connection. The network 365 transmits and receives data between the computer system 300 and external systems. In some embodiments, the network 365 may be a managed IP network administered by a service provider. The network 365 may be implemented in a wireless fashion, e.g., using wireless protocols and technologies, such as WiFi, WiMax, etc. The network 365 may also be a packet-switched network such as a local area network, wide area network, metropolitan area network, the Internet, or other similar type of network environment. The network 365 may be a fixed wireless network, a wireless local area network (LAN), a wireless wide area network (WAN) a personal area network (PAN), a virtual private network (VPN), intranet or other suitable network system and may include equipment for receiving and transmitting signals.

Storage systems 100 and methods according to this disclosure may be embodied, in whole or in part, in computer program products or in computer systems 300, such as that illustrated in FIG. 3.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method comprising:
   allocating a first entry in a global completion table (GCT) on a processor, responsive to a first instruction group being dispatched, wherein the first entry corresponds to the first instruction group;
   identifying a data value applicable to the first instruction group;
   calculating an offset value applicable to the first instruction group by subtracting, from the data value, a base value previously written to a second entry of the GCT for a second instruction group;
   writing the offset value in the first entry of the GCT in lieu of the data value;
   determining that no base value remains in the GCT for a thread to which a third instruction group belongs;
   allocating a third entry and a fourth entry in the GCT, responsive to determining that no base value remains in the GCT;
   writing in the third entry a second base value applicable to the third instruction group, responsive to determining that no base value remains in the GCT; and
   writing to the fourth entry a second offset value applicable to the third instruction group, responsive to determination that no base value remains in the GCT.

2. The method of claim 1, wherein writing the offset value occurs absent writing the data value in full for the first instruction group to the GCT.

3. The method of claim 1, wherein the offset value uses fewer bits of storage in the GCT than the data value requires.

4. The method of claim 1, further comprising retrieving the data value applicable to the first instruction group by adding the offset value applicable to the first instruction group to the base value previously written to the second entry of the GCT for the second instruction group.

5. The method of claim 1, wherein the first entry and the second entry are portions of a single record in the GCT.

6. The method of claim 1, wherein the first instruction group comprises two or more instructions.

7. The method of claim 1, wherein the first instruction group comprises a single instruction.

8. A system comprising:
   a global completion table (GCT);
   one or more threads of one or more processes in execution, wherein the one or more threads have access to the GCT and are configured to:
      allocate a first entry in the GCT, responsive to a first instruction group being dispatched, wherein the first entry corresponds to the first instruction group;
      identify a data value applicable to the first instruction group;
      calculate an offset value applicable to the first instruction group by subtracting, from the data value, a base value previously written to a second entry of the GCT for a second instruction group;
      write the offset value in the first entry of the GCT in lieu of the data value;
      determine that no base value remains in the GCT for a thread to which a third instruction group belongs;
      allocate a third entry and a fourth entry in the GCT, responsive to determining that no base value remains in the GCT;
      write in the third entry a second base value applicable to the third instruction group, responsive to determining that no base value remains in the GCT; and
      write to the fourth entry a second offset value applicable to the third instruction group, responsive to determination that no base value remains in the GCT.

9. The system of claim 8, wherein writing the offset value occurs absent writing the data value in full for the first instruction group to the GCT.

10. The system of claim 8, wherein the offset value uses fewer bits of storage in the GCT than the data value requires.

11. The system of claim 8, wherein the one or more threads are further configured to retrieve the data value applicable to the first instruction group by adding the offset value applicable to the first instruction group to the base value previously written to the second entry of the GCT for the second instruction group.

12. The system of claim 8, wherein the first entry and the second entry are portions of a single record in the GCT.

13. A computer processor comprising
   a global completion table (GCT);
   one or more threads of one or more processes in execution, wherein the one or more threads have access to the GCT and are configured to:
      allocate a first entry in the GCT, responsive to a first instruction group being dispatched, wherein the first entry corresponds to the first instruction group;
      identify a data value applicable to the first instruction group;
      calculate an offset value applicable to the first instruction group by subtracting, from the data value, a base value previously written to a second entry of the GCT for a second instruction group;
      write the offset value in the first entry of the GCT in lieu of the data value;
         determine that no base value remains in the GCT for a first thread, of the one or more threads, to which a third instruction group belongs;
      allocate a third entry and a fourth entry in the GCT, responsive to determining that no base value remains in the GCT;
      write in the third entry a second base value applicable to the third instruction group, responsive to determining that no base value remains in the GCT; and
      write to the fourth entry a second offset value applicable to the third instruction group, responsive to determining that no base value remains in the GCT.

14. The computer processor of claim 13, wherein writing the offset value occurs absent writing the data value in full for the first instruction group to the GCT.

15. The computer processor of claim 13, wherein the offset value uses fewer bits of storage in the GCT than the data value requires.

16. The computer processor of claim 13, wherein the one or more threads are further configured to retrieve the data value applicable to the first instruction group by adding the offset value applicable to the first instruction group to the base value previously written to the second entry of the GCT for the second instruction group.

17. The computer processor of claim 13, wherein the first entry and the second entry are portions of a single record in the GCT.

* * * * *